FRAME SYNCHRONIZATION OF PULSE TRANSMISSION SYSTEMS
Filed March 26, 1962 2 Sheets-Sheet 1
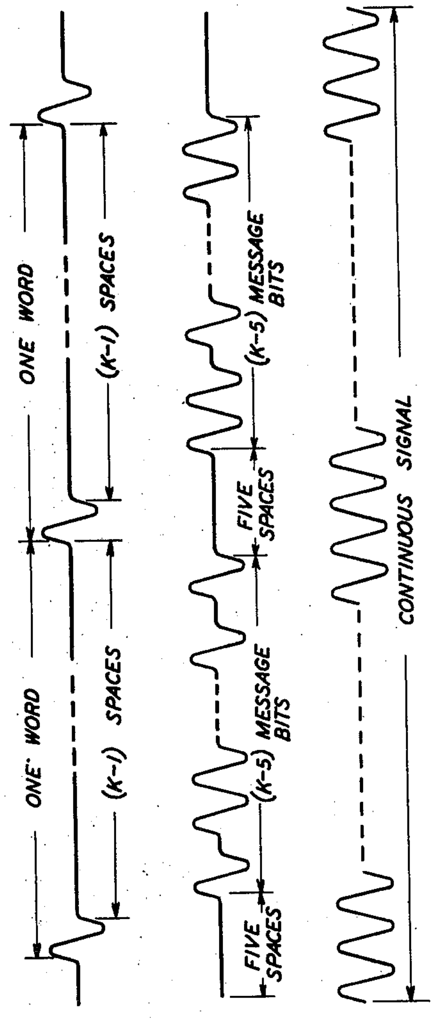
FIG. 1A START LINE
FIG. 1B DATA LINE
FIG. 1C TIMING LINE
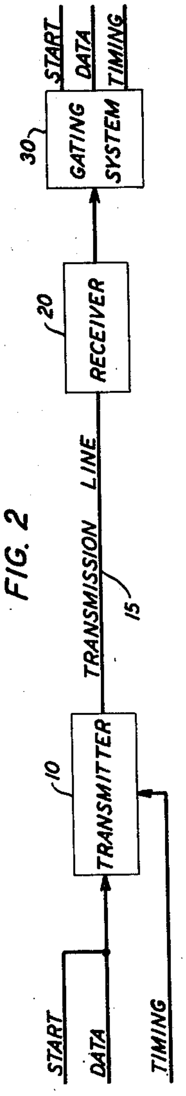
FIG. 2
INVENTOR
J. S. ENGEL
BY
J. P. Kearns
ATTORNEY INVENTOR
J.S. ENGEL
BY
J. P. Kearns
ATTORNEY United States Patent Office 3,159,812
Patented Dec. 1, 1964

3,159,812

FRAME SYNCHRONIZATION OF PULSE TRANSMISSION SYSTEMS

Joel S. Engel, Palisades Park, N.J., assignor to Bell Telephone Laboratories, Incorporated, New York, N.Y., a corporation of New York Filed Mar. 26, 1962, Ser. No. 182,559
5 Claims. (Cl. 340—146.1)

This invention relates to data transmission systems generally and more particularly to the synchronization of receiver apparatus with transmitter apparatus in such systems.

The development in recent years of far-flung data gathering systems whose information must be delivered to some central point for evaluation and comparison has necessitated the use of elaborate transmission systems. This is particularly so in military early warning defensive systems. Such a system must be prepared to track a multiplicity of possible targets and encode range and bearing information in digital form for transmission to the central evaluation point. Since this type of information is subject to standardization, groups of information are arranged in words of fixed length. These words are set off from one another by framing pulses usually of a form distinctive from that used for message information. For example, marking message bits may be represented by pulses of one polarity and the framing bits may be represented by pulses of the opposite polarity.

In the interest of economy it is advantageous to transmit this information over existing communications systems. The voice telephone network is an outstanding example of such a system. The telephone network, having been designed solely for voice communication suffers from several defects insofar as its adaptability to data transmission is concerned. The principal defect in this regard is its limited bandwidth. Ideally a data transmission system should have a wide bandwidth to realize high transmission speeds. Increasing the speed of binary message information toward its theoretical maximum uses all the available bandwidth and leaves no margin for the transmission of distinctive framing signals. With a distinctive framing signal the requirements are essentially those of a three-level system. Prior proposals have been made to distinguish among data and framing information by reserving three distinct amplitude levels for each type of signal for the mark and spaces of the message and for the distinctive framing signal. This occasions distinct noise penalties in that the signal-to-noise ratio is not the same for all parts of the signal and therefore the transmission medium is not being used at maximum efficiency. In other systems where slicing threshold levels are established to distinguish signal levels, the more levels required, the greater is the probability of error due to impulse noise.

It is accordingly an object of this invention to enable the transmission and reception of an essentially ternary signal in binary form.

According to this invention advantage is taken of the fact that message information in certain data handling systems is generated in words of fixed length prefixed with a start or framing signal. At the transmitter the distinctive start signal is converted into binary form and transmitted at the same amplitude as the message bits. At the receiver arrangements are made to accept a start signal only at a particular time in the word sequences. When the start signal is not detected at the expected time, it is assumed to have been destroyed in transmission and a new start signal is regenerated on the premise that it is more probable that an error in transmission occurred than that the transmitter and receiver have fallen out of synchronism. However, after a predetermined number of start signals are lost, the entire signal is scanned for the start signal pattern and once one is located scanning is limited to full word intervals. After the start pattern has been detected successively at full word intervals, a further predetermined number of times, the assumption is made that the true start signal has been located and normal operation is resumed.

A word length counter is provided to disable the start signal detector except at the beginning of each word. Auxiliary probability counters are provided to count the number of times no start signal is received in its expected position and also to count the number of times the start signal is found in a new position after loss of synchronism has apparently occurred and before the system is returned to normal operation.

It is another object of this invention to enable the use of a non-unique framing signal in a data transmission system in which messages are sent in fixed length blocks.

It is a further object of this invention to enable the separation of starting and message signals and their regeneration as a ternary signal.

It is a still further object of this invention to transmit a ternary combined start and message signal as a binary signal without increasing the bandwidth required.

It is a feature of this invention that the above objects are attained by the use of simple logic circuits.

It is another feature of this invention that no more start signal errors are obtained with binary transmission of start and message information than with ternary transmission.

It is still another feature of this invention that no additional bandwidth requirements are placed on the transmission medium.

Other objects, features and advantages of this invention will become apparent from consideration of the following detailed description and the drawing in which:

FIGS. 1A, 1B and 1C are waveforms of start, message and timing signals found in a data transmission system to which this invention is applicable;

FIG. 2 is a block diagram of a representative data transmission system to which the system of this invention is applied.

Figure 3:
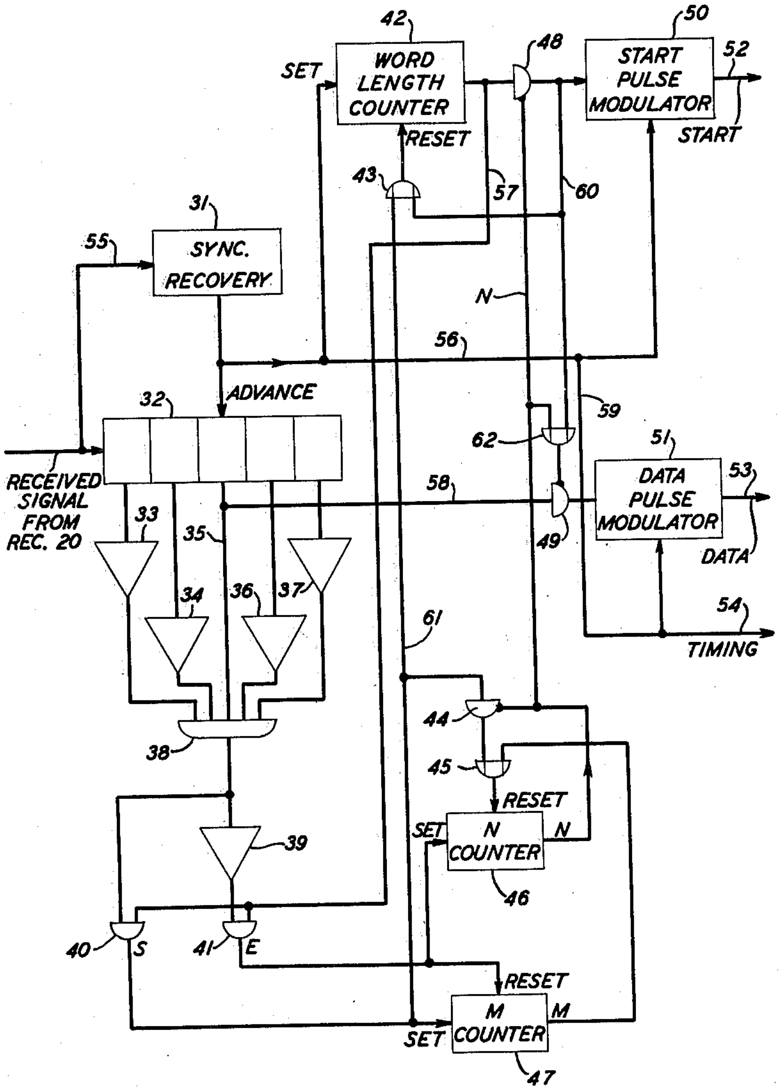
FIG. 3 is a block diagram of a data receiver with provision according to this invention for detecting non-unique start signals in a data word and for separating start and message signals.

A representative data handling system to which this invention is applicable supplies information on three separate leads. There is a start pulse occurring once per data word on one lead and this signal is of the form shown in FIG. 1A. Each start pulse appears as a single cycle of a sine wave or dipulse as shown. In any given message channel the word length is fixed at some arbitrary figure such as K, which may be 39, 56 or 259, for example.

There is message information occurring on a second line and having a waveform as shown in FIG. 1B. Space is provided for K–5 message bits between start bits. The message bits are composed of dipulses for marking bits and no signal for spacing bits. Spacing intervals are provided on either side of a start bit so that a start signal effectively uses five bit times. Data words are transmitted continuously without gaps between words. When no data information is being generated, spaces and parity bits are transmitted.

There is finally timing information occurring on a third lead as shown in FIG. 1C. The timing wave is a continuous sine wave at a frequency of 1300 or 1600 cycles per second. This is the same as the frequency of the start and data dipulses.

J. V. Harrington and Paul Rosen disclose in Patent No. 2,850,573 granted September 2, 1958, a system for transmitting just such a signal over telephone lines in which the three signal components are transmitted in a composite signal as discrete amplitudes and pulse amplitude discriminators are used to separate the three components at the receiver. In that system inefficient use is made of the power handling capabilities of the transmission system since only the synchronizing or framing pulses are transmitted at full amplitude and the message pulses are transmitted with a considerable signal-to-noise disadvantage. A transmission rate of 1600 bits per second is postulated in their system using a vestigial sideband signal in the voice frequency band.

FIG. 2 is a generalized block diagram of a data transmission system to which this invention is applicable. The input to transmitter 10 is supplied on three separate leads as start or framing information, message data information and timing information. Inasmuch as there is a guard space surrounding the start signal and no message bits are generated during the start interval the start and data signals can be combined on one line for transmission over a telephone line as shown. The timing wave may be used in any convenient way to maintain the start and data signals in synchronism.

Transmitter 10 may be of the type suggested in the aforesaid Harrington et al. patent designed to modulate the data information onto a voice carrier wave. In the alternative transmitter 10 may be of the phase modulation type disclosed in the application of P. A. Baker, Serial No. 120,312 filed June 28, 1961, now United States Patent No. 3,128,342 issued April 7, 1964. It may be noted from the Baker application that a serial data signal has successive elements paired and each pair is encoded on a voice carrier wave as a relative phase shift of successive carrier bursts. The result is that the phase shifts occur at only half the data rate. Thus, a 2400 bit per second data signal can be transmitted at a 1200 pulse per second transmission rate. In the alternative as suggested therein two independent, but synchronized, message channels can be transmitted simultaneously on a single carrier wave. Assuming a data rate of 1300 bits per second as mentioned hereinbefore, two channels can be encoded on a 1950 cycle per second carrier wave in accordance with the principles of the Baker application to effect an overall data rate of 2600 bits per second in the voice frequency band.

What ever the modulation method adopted, the output of transmitter 10 is applied to transmission line 15, which may be a land telephone line. If the Baker transmission system is adopted, no separate timing wave need be transmitted and no local oscillator is required at the receiver. Timing can always be recovered at receiver 10 in any other system from the phase transitions in the transmitted wave, which transitions can be used to synchronize a local oscillator thereat.

Receiver 20 may be of any conventional type adapted to operate with the system used in transmitter 10. In receiver 20 the timing wave is recovered from the signal in any appropriate way. If the Baker transmission system is used, timing information is recovered from the phase transitions in accordance with the principles of M. A. Logan Patent No. 3,020,479 issued February 6, 1962, and the data and start information is recovered in accordance with the principles disclosed in another application of P. A. Baker, Serial No. 49,544 filed August 15, 1960, now United States Patent No. 3,128,343 issued April 7, 1964. At the output of receiver 20 the data and start signals exist as a single pulse train. Gating system 30, in accordance with this invention, provides means for separating the start and data information and regenerating them in the same form in which they were delivered to transmitter 10. The start, data and timing waves are shown emanating from gating system 30 on three separate leads.

The type of data signal of fixed word length postulated here is to be contrasted with the start-stop telegraph signal. The latter signal contains fixed length characters and synchronism must be maintained between transmitter and receiver within each character. However, no synchronism is required between characters. Furthermore, a stop element occurs at the termination of each character.

The signal to be transmitted here is continuous in nature with no gaps between words. Only a regularly recurring start or frame signal introduces each word. Theoretically, if the terminal equipments were capable of retaining their synchronism indefinitely, the start signal would not have to be transmitted, but it could be regenerated in the receiver at proper times. In any real system, however, synchronism cannot be maintained indefinitely and timed regeneration of the start signal would be unreliable. Therefore, it is necessary in a practical system to transmit a start signal to test and maintain the synchronism of the receiver. In prior systems a uniquely recognizable code for the start signal has been required. This invention greatly eases this requirement.

This invention makes it possible to transmit the combined start and message signal, although ternary in nature, in binary form. This straightforward coding obviates any increase in signaling rate or in susceptibility to start pulse errors.

According to this invention the start pulse, including the five-space data block in the middle of which it falls, is encoded as a five bit binary block. In the particular example discussed, and this is not to be considered limiting, the five-bit block is considered to be of the form 00100, when the zeroes represent spaces and the one is a mark. This five-bit block is obviously not unique and the particular combination may frequently occur in the message itself. However, relying on the fact that the start code appears at regular intervals, a counter is provided at the receiver to count exactly one word length and gate a start detector only at intervals of one word time. Any combination of message data bits having the form of the start code is ignored by the start detector. If, when the incoming signal is inspected for the start code, the start code is not found, either of the following two faults have occurred: (1) an error in transmisison has occurred during one or more of the bits in the start code, due to the effects of noise on the line, for example; or (2) the receiver is not in synchronism with the transmitter, due to a drift in the regenerated timing circuit, for example. The probability of the former fault is considered to be greater than that of the latter. Therefore, in the event that the start code is not detected at the expected time, the assumption is made that the first fault is present and a start pulse is generated and the data allowed to pass to the output of the receiver. An auxiliary counter is used to note the missing code block. If on subsequent inspections the start code is still not found, it becomes more probable that the second fault has in fact occurred. For any given block length there exists a number N related to the relative probabilities of the occurrence of the two faults beyond which it becomes at least as probable that the second fault has occurred rather than the first.

When N successive start code blocks are missed, the system is arranged to recover its synchronism by disabling the block length counter and scanning the entire incoming signal for the start code pattern. When the start pattern does appear, it may represent either a true start code or it may be five consecutive bits of message data identical with the start pattern. For this reason the receiver does not immediately apply a start pulse to the outgoing line, but rather inspects the incoming signal at one word time intervals for the start pattern. If the start pattern is found M consecutive times, it becomes highly probable that the pattern represents true start codes. The number M is to be determined from an analysis of the given transmission system. When the start pattern has been detected M times in succession, the system is returned to normal and start pulses are once more generated. Any time the start pattern is not detected M consecutive times, a new scan is begun until the true start pattern is encountered.

The information transmitted during the scanning interval is blocked from the output and is lost, although the last (M–1) blocks are undoubtedly accurate. The loss of a small amount of correct information is the price paid for blocking all incorrect information.

An important characteristic of the system of this invention is that the gating by the word length counter causes the start pulse to be less prone to error than a system in which the message is continuously scanned for a unique start pulse. In the instant system, lost start pulses occur only when more than N start codes in succession are lost in transmission. Gained start pulses can only occur when more than M false start codes occur in successive words, precisely one word time apart following the loss of N consecutive start codes. Such a combination of events is highly improbable and the extreme signal and noise condition required to cause them would prevent successful data transmission even if no start pulse errors occurred.

FIG. 3 illustrates one embodiment of a start gating circuit for accomplishing the objects of this invention. Incoming signals from line 15 of FIG. 2 are demodulated in receiver 20 to a serial pulse wave including both start and message bits. The timing wave is recovered from pulse transitions in any convenient manner in synchronization recovery block 31 connected to the incoming line over lead 55. Sync recovery block 31 may be included in receiver 20 in actual practice. The incoming pulse signal is applied to a shift register 32 indicated as having five stages on the assumption that the start pattern is a five-bit block such as the pattern 00100. The pulses stored in the shift register are advanced under the control of an advance pulse derived from the sync recovery circuit 31 at the transmission rate of say 1300 bits per second. The five bits of signal in the shift register are applied in parallel to logic circuits comprising inverters 33, 34, 36 and 37 and AND-gate 38. The output of the center stage of the register is applied directly to AND-gate 38 over lead 35. AND-gate 38 produces an output whenever the start pattern appears.

The timing signal is also applied to the set input of a word length counter 42. This counter normally produces an output on lead 57 every K timing pulses. An output on lead 57 enables AND-gates 40 and 41. AND-gate 40 receives the direct output of gate 38 and AND-gate 41, the inverted output of gate 38 through inverter 39. When the start pulse code occurs simultaneously with the output of counter 42, signal S occurs in the output of gate 40 on lead 61. The output of counter 42 also enables start pulse modulator 50 through inhibit gate 48 which is normally open when there is no signal on lead N. Modulator 50 timed from lead 56 emits a start pulse on lead 52 at this time in the form required by the particular system: in this case, a dipulse. The output S of gate 40 resets counter 42 through OR-gate 43 on lead 61. Counter 42 then proceeds to count another word length. The occurrence of the start pattern in the message portion of the incoming signal produces no signal S because gate 40 is enabled only when counter 42 produces an output.

A data pulse modulator 51 is also provided to produce message dipulses on lead 53. The input to modulator 51 is obtained from the center stage of register 32 over lead 58 through inhibit gate 49. Gate 49 is inhibited by the output of counter 42 on lead 60 through OR-gate 62 whenever the start pulse itself is being generated. OR-gate 62 is not necessary, however, to the practice of this invention, if it is assumed that the terminal equipment itself rejects all data not prefixed by a start signal.

When counter 42 indicates the end of a word and an output appears on lead 57 at a time when no start pattern is detected, no output S occurs and an output E occurs at gate 41 to indicate a lost start code. Output E sets N counter 46, which counts successive start pulse errors. Counter M, described below, is held reset by output E. Inhibit gate 48 is not disturbed and the output of counter 42 is applied to start modulator 50 and a start pulse is generated nevertheless. This output on lead 60 resets counter 42 through OR-gate 43 and the message continues to be delivered to data modulator 51. If, coincident with a subsequent output of counter 42, the start pattern occurs, counter N is reset through inhibit gate 44 and OR-gate 45 and the system remains in normal operation. However, if N successive errors occur counter N produces an output on lead N, which operates inhibit gates 48, 44 and 49, the latter through OR-gate 62. The operation of gate 48 prevents the generation of any further start pulses by start modulator 50. The operation of gate 44 prevents any signal S from resetting counter N. The operation of gate 49 through OR-gate 62 prevents the delivery of any further message data from operating modulator 51. Counter 42 continues to produce an output on lead 57, thereby keeping gates 40 and 41 enabled.

The next occurrence of the start pattern may or may not be the true start pattern. An output on lead S, when it occurs, now sets M counter 47 and resets counter 42. One word length later, if no start pattern is present, counter M is reset but counter 42 is not affected until a new start pattern is located. When the start pattern is found M times in succession at word-length intervals without the generation of an E signal, it is assumed that the true start pattern has been found and the signal M appears at the output of the M counter. This signal resets the N counter. Signal N thereupon vanishes and gates 48 and 49 are opened. Counter N need not be reset, since the first occurrence of signal E will reset it. The system is thus restored to normal operation. The only data lost was that occurring during the scanning process. This system thus restores the receiver to synchronism faster than systems which would allow the start detector to slip one bit at a time until a unique start code is detected.

The timing signal output from sync recovery circuit 31 is delivered as a gating system output on lead 54 by way of leads 56 and 59. The timing signal controls the operation of start pulse modulator 50 and data pulse modulator 51 in a conventional manner.

While this system has been described in connection with a specific embodiment, it will become clear to those skilled in the art that the principles illustrated are susceptible of considerable modification without departing from the spirit and scope of the invention. This invention is applicable to the framing of multichannel pulse code modulation systems in an obvious manner.

What is claimed is:

1. In a data communication system in which message signals are transmitted in fixed length word groups, prefixed by a non-unique start pattern,
   - a receiving station including separate output lines for start and data elements,
   - and also including means for distinguishing said start pattern when it occurs in its correct relation to said word group from similar patterns occurring at random within said word group comprising,
   - a register at the input of said receiving station for storing portions of incoming word groups equal in length to said start pattern and producing an output when said start pattern is detected therein,
   - logic circuitry responsive to the output of said register for producing a start pulse output when said start pattern is detected and an error output otherwise,
   - a first counter responsive to said start pulse output and adjusted to count the period between legitimate start patterns,
   - the output of said first counter disabling said logic circuitry during the counting period,
   - a second counter responsive to said error output for counting a predetermined number of times that said error output occurs and thereafter blocking said first counter and allowing said logic circuitry to scan the full word groups for said start pattern, and a third counter made responsive to said start pulse output for counting the predetermined number of times said start pattern is successively detected at the proper time intervals during the scanning of the full word groups and thereafter unblocking the output of said first counter to restore operation to normal.

2. A data transmission system in which message data is generated in fixed length words on one line and a start pattern time interleaved with said words is generated on another line comprising means for transmitting said message data and start pattern as a continuous binary signal to a remote point, and means at said remote point for separating said message data and said start pattern from said continuous signal into two distinct channels, said last means comprising start detector means uniquely responsive to said start pattern whether it is a true start pattern or a similar pattern occurring within the message data and producing a corresponding output, first counting means producing an output at intervals equivalent to said fixed word length, a start pulse modulator controlled by the output of said first counting means and having an output to a start channel, first coincidence means responsive to concurrent outputs of said detector means and said first counting means for resetting said first counting means, second coincidence means responsive to the concurrence of the complement of the output of said detector means and the direct output of said first counting means for producing an error output, a data pulse modulator normally connected to said start detector for producing a data channel output, second counting means responsive to the output of said second coincidence means for producing an output after a predetermined number of successive error signals are received, the output of said second counting means blocking the inputs to said start and data modulators, and third counting means responsive to an output from said first coincidence means for producing an output after a preassigned number of successive resynchronizing start patterns are counted, the output of said third counting means resetting said second counting means thereby restoring said separating means to normal.

3. A framing signal detector for a continuous binary data signal including a non-unique framing pattern occurring at least at fixed time intervals comprising a shift register having as many cells as there are elements in the framing pattern, timing recovery means having an output at the data rate, means for applying said data signal to said register and to said timing recovery means, means under the control of said timing recovery means for advancing the data signal serially through said register at the data rate, a data modulator accepting the serial output of said register for regenerating data pulses in its output, logic circuitry having inputs connected in parallel to all the cells of said register for producing a start output when said framing pattern appears in the data signal and an error output otherwise, a counter under the control of said timing recovery means stepping at the data rate and producing an output at said fixed time intervals, a framing pulse modulator for regenerating framing pulses responsive to an output from said counter, means responsive alternatively to the start output of said logic circuitry and the output of said counter for resetting said counter, means for disabling said resetting means when a predetermined number of error outputs appear in succession thereby permitting a start output from said logic circuitry whenever the framing pattern appears, and means responsive to the recovery of a preassigned number of successive framing patterns at the fixed time intervals for reenabling said counter and disabling said disabling means.

4. In a data communication system in which a continuous binary data signal includes a distinctive but non-unique framing pattern at fixed word intervals a receiver capable of separating said framing pattern from message data comprising an input point for said continuous data signal, a first output point for framing pulses, a second output point for message pulses, a framing pattern detector producing a start output whenever said framing pattern appears at said input point and an error output otherwise, an interconnection between said framing pattern detector and said second output point, a word length counter normally delivering an output to said first output point once every fixed word interval and simultaneously blocking said second output point, means for gating the start output of said detector to said word length counter to restart it, a connection from the output of said word length counter to its input to render said word length counter self-restarting independently of the start output of said detector, an error counter jointly responsive to the error output of said detector and the output of said word length counter for producing an output after failure of detection of said framing pattern in said detector a predetermined number of times, the output of said error counter being effective to block both output points and prevent restarting said word length counter over said connection, and a relocated framing pattern counter jointly responsive to the start output of said detector and the output of said word length counter for producing an output after a preassigned number of relocated successive framing patterns have been detected at word length intervals, the output of said last-mentioned counter being effective to reset said error counter and unblock both said output points.

5. The data communications system of claim 4 in which said framing pattern detector comprises a multistage shift register having the number of stages equal to the number of elements in said framing pattern, a coincidence gate having parallel inputs connected to each stage of said register from which said start output is obtained, one or more inverting gates in series with the inputs of said coincidence gate to cause a start output therefrom only when said framing pattern is present in said register, and a further inverting gate connected to the output of said coincidence gate for deriving said error output whenever said framing pattern is absent from said register.

References Cited in the file of this patent

UNITED STATES PATENTS

| | | |
|---|---|---|
| 2,892,888 | James et al. | June 30, 1959 |
| 2,943,149 | Irland et al. | June 28, 1960 |